United States Patent
Dageville et al.

(10) Patent No.: US 11,869,051 B2
(45) Date of Patent: Jan. 9, 2024

(54) USAGE MONITORING AND USAGE BASED DATA PRICING

(71) Applicant: Snowflake Inc., Bozeman, MT (US)

(72) Inventors: Benoit Dageville, San Carlos, CA (US); Sameer Deshpande, Mountain View, CA (US); Eric Dorf, Port Townsend, WA (US); Subramanian Muralidhar, Mercer Island, WA (US); Chao Ren, Foster City, CA (US); Dangfu Wang, Fremont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/710,598

(22) Filed: Mar. 31, 2022

(65) Prior Publication Data
US 2023/0316348 A1 Oct. 5, 2023

(51) Int. Cl.
*G06F 9/44* (2018.01)
*G06Q 30/04* (2012.01)
*G06F 16/25* (2019.01)
*G06F 9/54* (2006.01)
*G06Q 20/14* (2012.01)

(52) U.S. Cl.
CPC ............. *G06Q 30/04* (2013.01); *G06F 9/547* (2013.01); *G06F 16/256* (2019.01); *G06Q 20/145* (2013.01)

(58) Field of Classification Search
CPC .... G06Q 30/04; G06Q 20/145; G06F 16/256; G06F 9/547
USPC ..................................... 717/119–122
See application file for complete search history.

(56) References Cited

U.S. PATENT DOCUMENTS

| | | | | |
|---|---|---|---|---|
| 6,377,993 | B1 * | 4/2002 | Brandt | H04L 41/5022 709/227 |
| 6,714,979 | B1 * | 3/2004 | Brandt | H04L 63/0236 709/227 |
| 2013/0166580 | A1 * | 6/2013 | Maharajh | G06Q 50/01 707/758 |

* cited by examiner

*Primary Examiner* — Chuck O Kendall
(74) *Attorney, Agent, or Firm* — Womble Bond Dickinson (US) LLP

(57) ABSTRACT

Embodiments of the present disclosure describe techniques for monitoring usage of data listings and pricing data listings based thereon. Metadata comprising a pricing plan may be added to a data listing to generate a monetized data listing. The monetized data listing may be imported to the consumer account. The usage data of the monetized data listing and listing data of the monetized data listing may be exported to a data warehousing and analysis module. A usage level for a set of jobs processed using the monetized data listing during a current incremental interval of a current billing interval may be calculated and combined with a usage level of all previous incremental intervals of the current billing interval to generate a cumulative usage record. An invoice for the billing interval may be generated based on the cumulative usage record.

24 Claims, 15 Drawing Sheets

| Column | description |
|---|---|
| deployment | Name of the consumer account deployment |
| account_id | Consumer account id |
| uuid | Job uuid |
| start_time | Job start time |
| end_time | Job end time |
| import_listing_id | The listing id column from JobDPO stats slice, which points back to DataExchangeListingOrShareImportDPO |
| is_monetizable | Whether this usage is monetized or free, we may have following scenarios:<br>• A share with no listing, is_monetizable=false<br>• A non-monetized listing, is_monetizable=false<br>• A monetized listing, but in trial mode, is_monetizable=false<br>• A monetized listing, and in buy mode, is_monetizable=true |
| is_reused | If this job is using other job's share usage |
| record_time | Timestamp when the record inserted into this table |

*FIG. 5B*

| Column | Description |
|---|---|
| deployment | Deployment name for consumer account |
| account_id | Consumer account id |
| import_listing_id | Id from local DataExchangeListOrShareImportDPO |
| listing_entity_id | The listing id from provider |
| share_id | The share id from provider |
| database_id | Database id when consumer use the listing |
| pricing_month | Month start time truncated to month level |
| is_trial | If this is a trial listing for this consumer account |
| purchase_order_id | Purchase order number |
| price_plan | The price plan will be used for that month |
| create_time | Time this record is created in Snowhouse |
| is_from_future_plan | Indicate if this price plan is from future, for debug purpose |

| Column | Description |
|---|---|
| deployment | Name of the consumer account deployment |
| account_id | Consumer account id |
| import_listing_id | The id from DataExchangeListingOrShareImportDPO |
| usage_date | This will be the job start date (truncate to day) |
| process_time | Timestamp when the record is saved |
| monetizable_query_count | Monetizable query count for this usage date processed in this batch |
| non_monetizable_query_count | Non-monetizable query count for this usage date processed in this batch |
| min_job_start_time | Min start times for jobs in this batch |
| max_job_start_time | max start times for jobs in this batch |
| min_job_end_time | Min end times for jobs in this batch |
| max_job_end_time | Max end times for jobs in this batch |
| min_job_record_time | Min job record times for jobs in this batch |
| max_job_record_time | Max job record times for jobs in this batch |

FIG. 5D

| Column | Description |
|---|---|
| batch_id | The incremental sequence id for each batch |
| deployment | Name of the consumer account deployment |
| account_id | Consumer account id |
| import_listing_id | The id from DataExchangeListingOrShareImportDPO |
| usage_date | This will be the job start time truncated to date |
| incremental_process_time | Timestamp when this monetization calculation start |
| monetizable_query_count | Monetizable query count for this usage date processed in this batch |
| non_monetizable_query_count | Non-monetizable query count for this usage date processed in this batch |
| free_query_count | Free query count in this batch |
| chargeable_query_count | Chargeable query count in this batch |
| exceed_max_cap_query_count | Number of queries which is exceed the maximum cap of usage |
| base_usage | Base amount charged for this batch |
| variable_usage | Variable amount charged for this batch |

| Column | Description |
|---|---|
| batch_id | The incremental sequence id for each batch |
| deployment | Name of the consumer account deployment |
| account_id | Consumer account id |
| import_listing_id | The id from DataExchangeListingOrShareImportDPO |
| usage_month | Job start time to month |
| incremental_process_time | The timestamp when the batch is added into incremental_monetizer |
| sum_monetizable_query_count | Number of queries that are 'monetizable' in the current usage_month |
| sum_non_monetizable_query_count | queries that are non-monetizable because<br>• this is not a monetized listing<br>• this is a vanilla share (not a listing)<br>• this is a monetized listing but is currently in that mode |
| sum_free_query_count | Number of queries that are free |
| sum_exceed_max_cap_query_count | Number of queries that exceed the max cap |
| sum_chargeable_query_count | Number of queries that are actually chargeable |
| base_usage | Base usage charged |
| variable_usage | Variable usage charged |

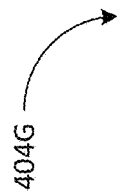

FIG. 5F

| Column | Data type | Description | |
|---|---|---|---|
| monetizer_record_id | varchar | Unique record id | |
| monetizer_type | varchar | "Data Marketplace" | |
| billing_entity_id | varchar | Should be from AccountDPO | |
| product_code | varchar | Possible values: <br> * Data Marketplace fixed price <br> * Data Marketplace variable price | |
| monetizer_recorded_time | timestamp | timestamp the record is created | |
| billing_period_start_time | timestamp | Month start time for the billing period, truncate to month | |
| usage_start_time | timestamp | usage start time(truncate to month) | |
| usage_end_time | timestamp | usage end time(truncate to month) | |
| account_id | int | Account id of buyer(for uniqueness) | |
| po_number | varchar | PO# from ListOrShareImportDPO | |
| group_name | varchar | Snowflake_account_name (buyer) | |
| description | varchar | Listing_Name + Product_Code | |
| quantity | decimal | 1 for fixed, query count - free count for variable | |
| currency_code | varchar | Local currency/standard currency | |
| unit_amount | decimal | Unit price | |
| seller_billing_entity_id | varchar | From accountDPO | |
| item_id | int | interval listed for | |
| import_listing_id | int | E.g., DMX | |
| generation_batch_id | int | Stores id to uniquely identify this process batch. interval based | |
| snowflake_fee_percent | float | | |
| deployment | varchar | Consumer account deployment | |

*FIG. 5G*

USAGE MONITORING AND USAGE BASED DATA PRICING

TECHNICAL FIELD

The present disclosure relates to data sharing platforms, and particularly to monitoring usage of data and pricing data based on the monitored usage.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 5A-5H are diagrams illustrating job metadata and listing metadata as it is processed by a data warehousing and analysis system, in accordance with some embodiments of the present invention.

DETAILED DESCRIPTION

Figure 1A:
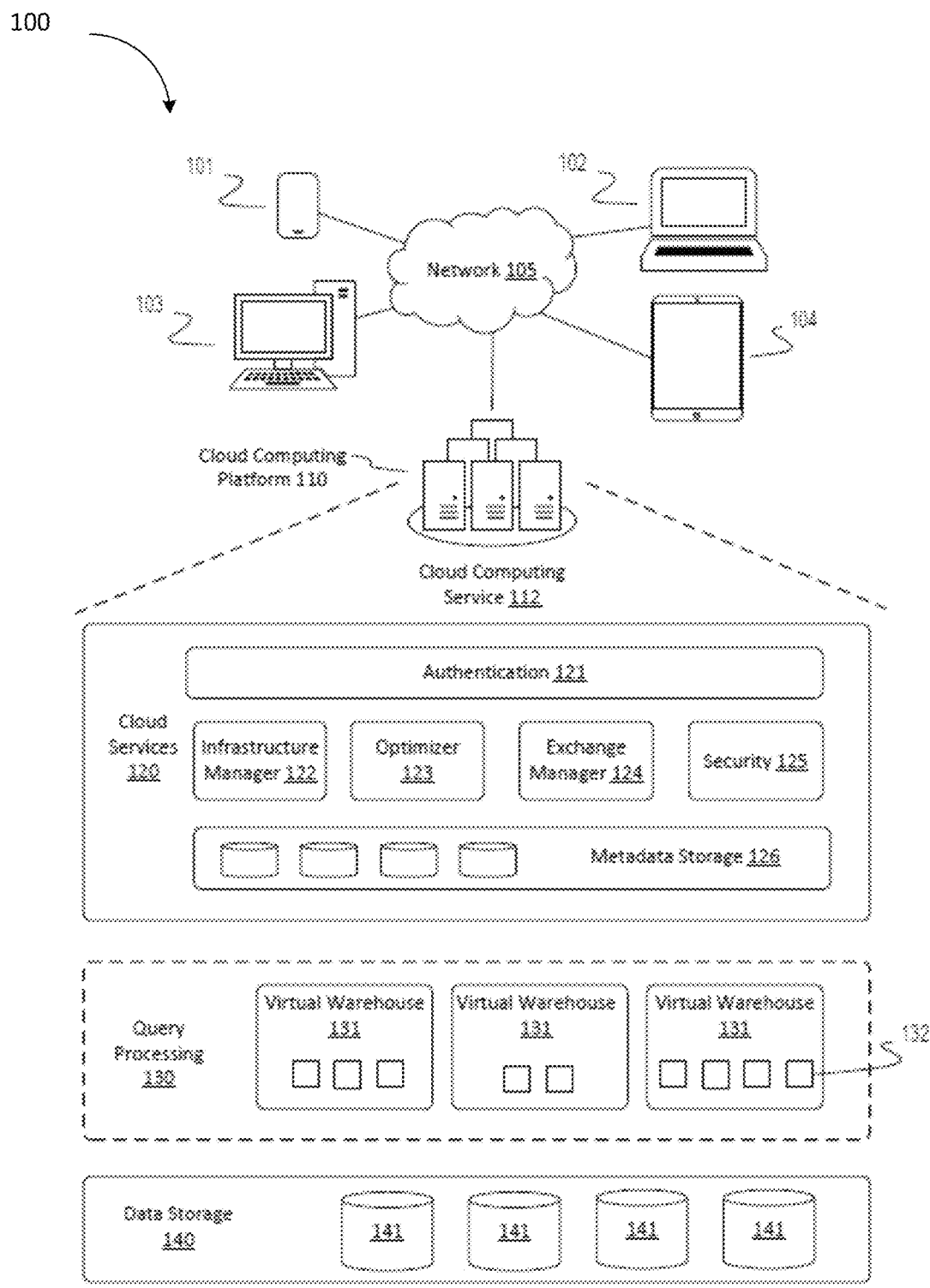
FIG. 1A is a block diagram depicting an example computing environment in which the methods disclosed herein may be implemented, in accordance with some embodiments of the present invention.

Data providers often have data assets that are cumbersome to share. A data asset may be data that is of interest to another entity. For example, a large online retail company may have a data set that includes the purchasing habits of millions of consumers over the last ten years. This data set may be large. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A may be a consumer data company that has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share. Only those consumer accounts that are specifically listed in the share may be allowed to look up, access, and/or import from this share. By modifying the list of references of other consumer accounts, the share can be made accessible to more accounts or be restricted to fewer accounts.

In some embodiments, each share contains a single role. Grants between this role and objects define what objects are being shared and with what privileges these objects are shared. The role and grants may be similar to any other role and grant system in the implementation of role-based access control. By modifying the set of grants attached to the role in a share, more objects may be shared (by adding grants to the role), fewer objects may be shared (by revoking grants from the role), or objects may be shared with different privileges (by changing the type of grant, for example to allow write access to a shared table object that was previously read-only). In some embodiments, shares in a provider account may be imported into the target consumer account using alias objects and cross-account role grants.

When data is shared, no data is copied or transferred between users. Sharing is accomplished through the cloud computing services of a cloud computing service provider such as SNOWFLAKE™. Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

A data exchange may also implement role-based access control to govern access to objects within consumer accounts using account level roles and grants. In one embodiment, account level roles are special objects in a consumer account that are assigned to users. Grants between these account level roles and database objects define what privileges the account level role has on these objects. For example, a role that has a usage grant on a database can "see" this database when executing the command "show databases"; a role that has a select grant on a table can read from this table but not write to the table. The role would need to have a modify grant on the table to be able to write to it.

Data exchanges may offer a variety of subscription/pricing models. For example, in a fixed subscription based pricing model, a consumer pays a fixed price for a fixed period regardless of their under/over usage of the data. However, such models do not provide data purchasers with the flexibility to pay only for the amount they have consumed via queries.

Embodiments of the present disclosure provide a usage monitoring scheme that allows for usage-based pricing for data. The solution introduces a usage based model for data purchases. Under this model, data purchasers have the flexibility to pay only for the amount they have consumed via queries. Unlike traditional subscription-based pricing models, a consumer pays the same fixed price if they run a million queries on the purchased or no queries at all, thereby achieving a more aligned price-to-value. This in turn enables providers of data to more easily offer self-serve experiences for providing data and obtain data on the usage of the data itself.

FIG. 1A is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
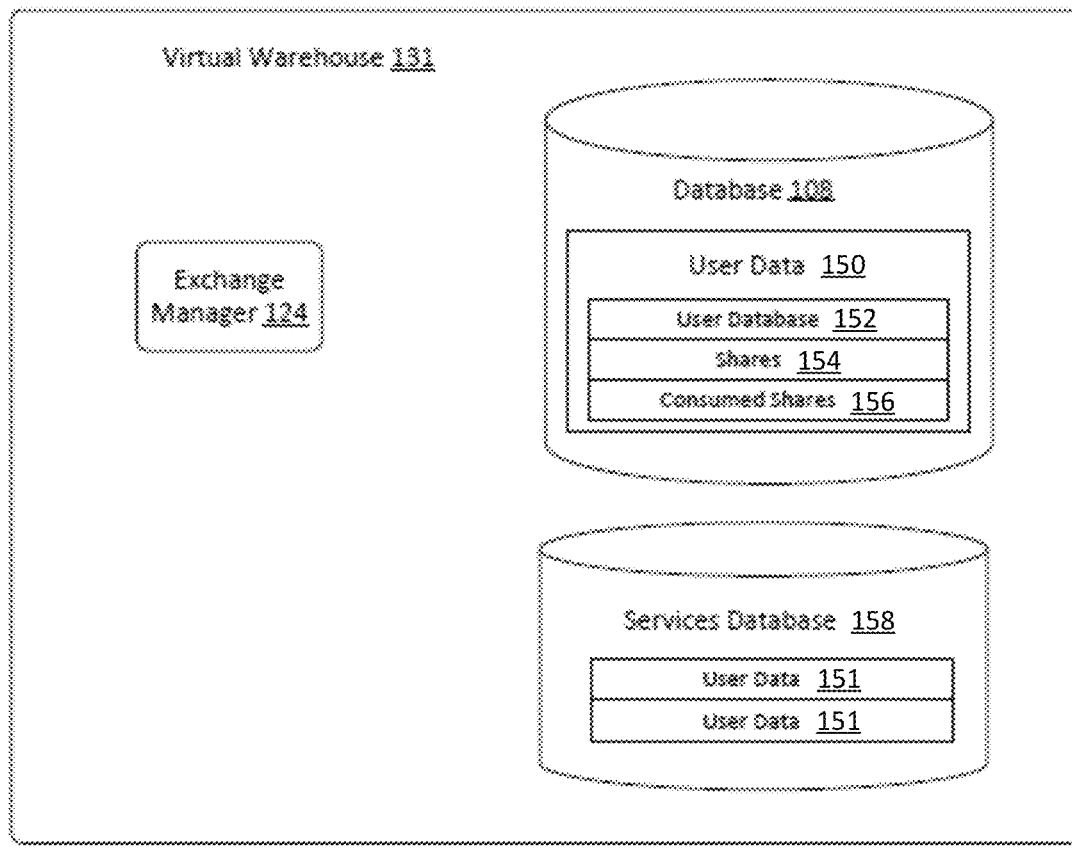
FIG. 1B is a block diagram illustrating an example virtual warehouse, in accordance with some embodiments of the present invention.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g. different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner according to the methods disclosed herein. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created in the consumer account (also referred to herein as an imported database) using information provided in the share. Access to the content of the database may be controlled by the data provider while access to the imported database created in the consumer account may be controlled by the consumer.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

Figure 2:
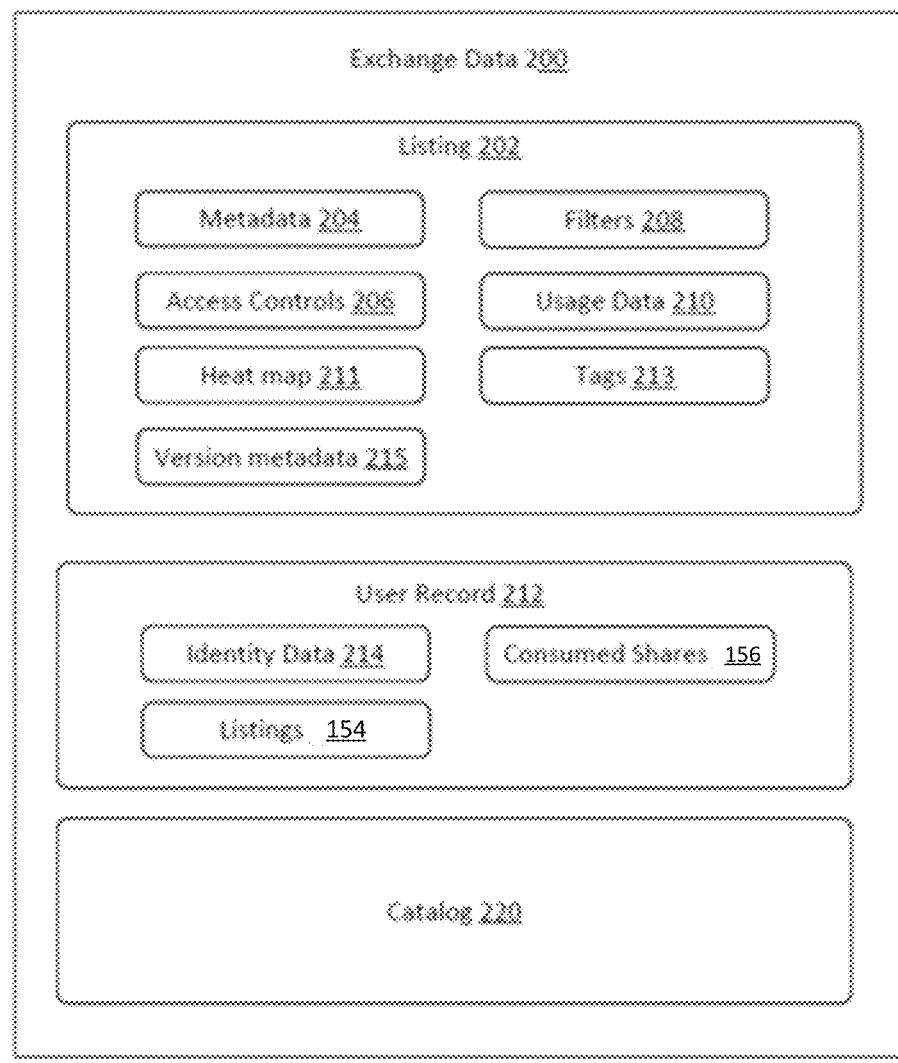
FIG. 2 is a schematic block diagram of data that may be used to implement a public or private data exchange, in accordance with some embodiments of the present invention.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

A listing 202 may include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share (see discussion of FIG. 4) in which users may request access but are only allowed access upon approval of the provider. The access controls 206 may specify a set of user identifiers of users that are excluded from being able to access the data referenced by the listing 202.

Figure 4:
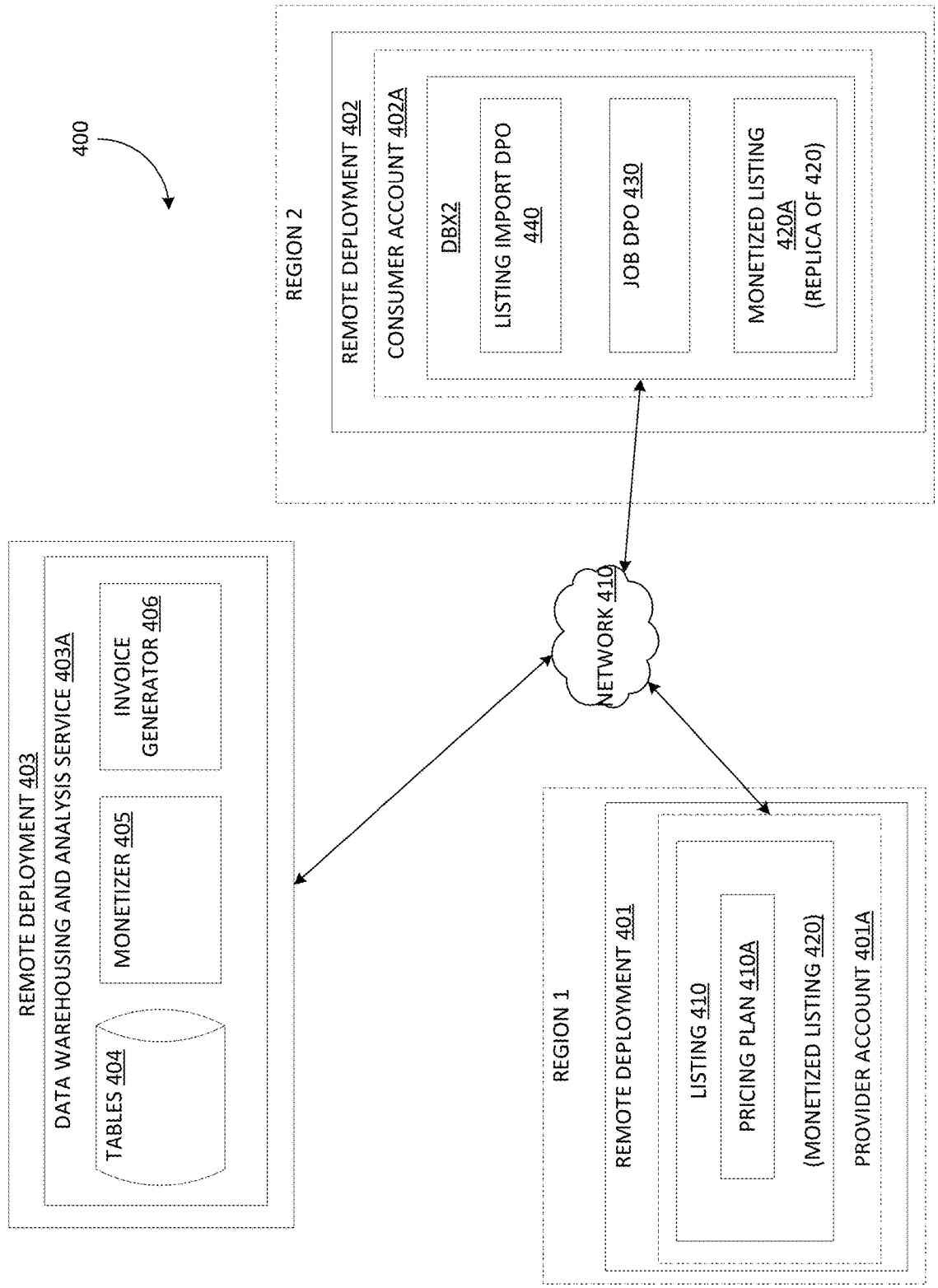
FIG. 4 is a block diagram of a deployment of a cloud environment, illustrating data listing usage monitoring and pricing techniques, in accordance with some embodiments of the present invention.
Figure 6:
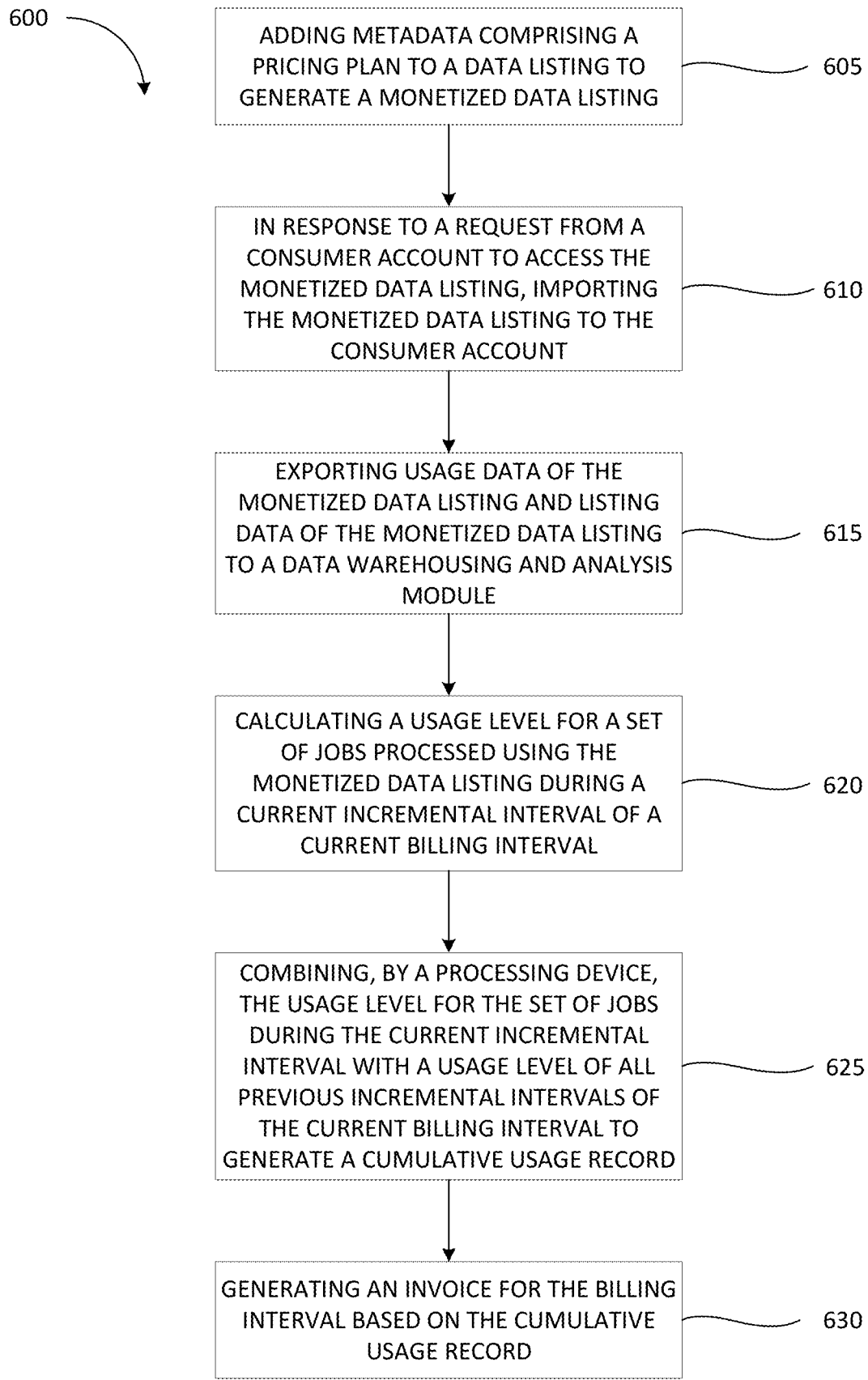
FIG. 6 is flow diagram of a method for monitoring usage of a data listing and pricing the data listing based on the monitored usage, in accordance with some embodiments of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific user identifiers 214 of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identifier 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares 156 of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 151 in a service database 158 and managed by the virtual warehouse 131.

The user record 212 may list shares associated with the user, e.g., reference listings 202 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares 156 of a user record 212.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only on specified on or more computing platforms 110.

In some embodiments, the catalog 220 is made available on the Internet such that it is searchable by a search engine such as BING or GOOGLE. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

Figure 3:
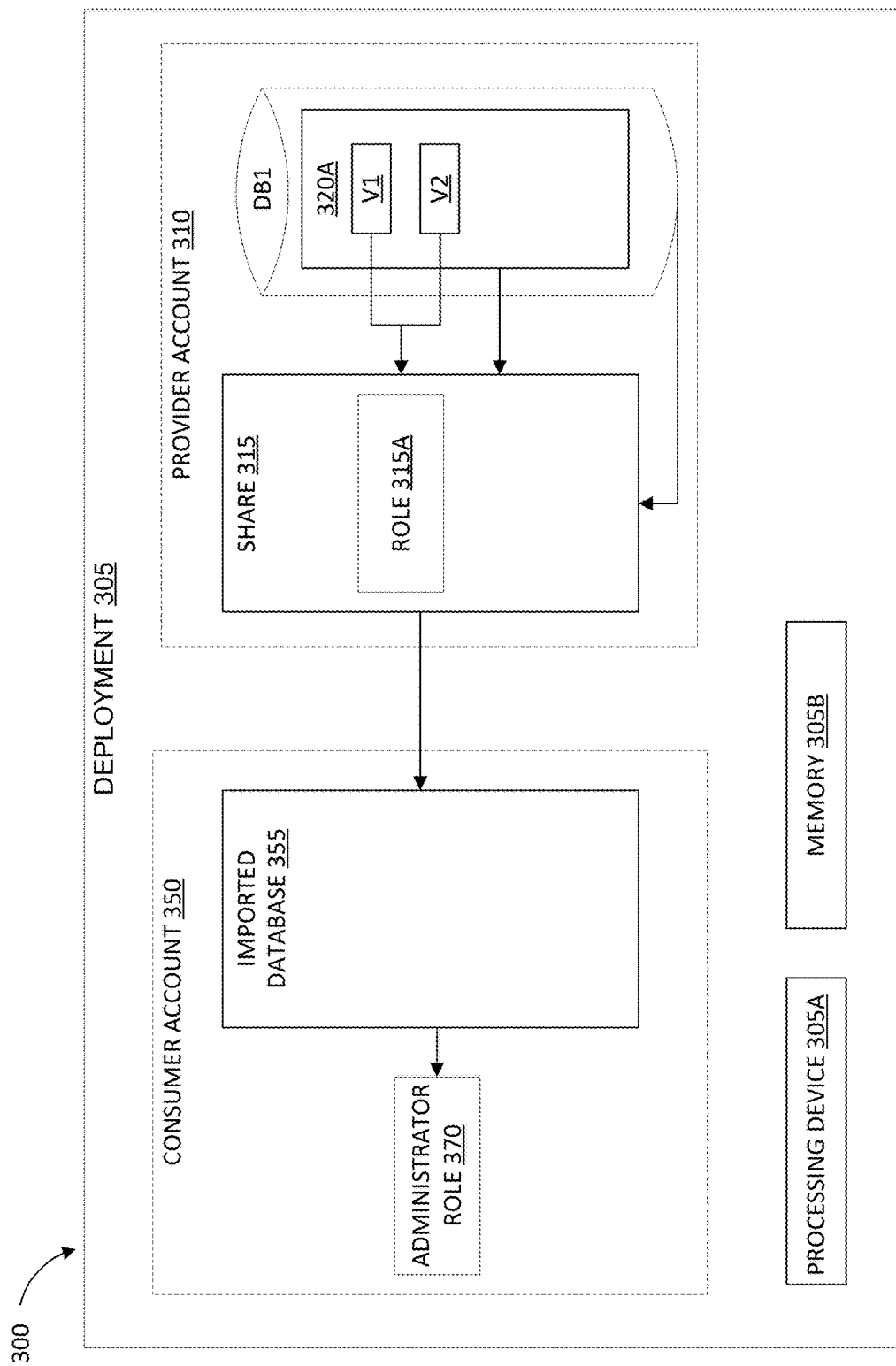
FIG. 3 is a schematic block diagram of a deployment of a data exchange that illustrates object sharing techniques, in accordance with some embodiments of the present invention.

FIG. 3 illustrates a cloud environment 300 comprising a cloud deployment 305 (shown in FIG. 3 and hereinafter referred to as deployment 305), which may comprise a similar architecture to cloud computing service 112 (illustrated in FIG. 1A) and may be a deployment of a data exchange or data marketplace. Although illustrated with a single deployment 305, the cloud environment 300 may have multiple cloud deployments which may be physically located in separate remote geographical regions but may all be deployments of a single data exchange or data marketplace. Although embodiments of the present disclosure are described with respect to a data exchange, this is for example purposes only and the embodiments of the present disclosure may be implemented in any appropriate enterprise database system or data sharing platform where data and/or applications may be shared among users of the system/platform.

The deployment 305 may include hardware such as processing device 305A (e.g., processors, central processing units (CPUs), memory 305B (e.g., random access memory (RAM), storage devices (e.g., hard-disk drive (HDD), solid-state drive (SSD), etc.), and other hardware devices (e.g., sound card, video card, etc.)). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The deployment 305 may comprise any suitable type of computing device or machine that has a programmable processor including, for example, server computers, desktop computers, laptop computers, tablet computers, smartphones, set-top boxes, etc. In some examples, the deployment 305 may comprise a single machine or may include multiple interconnected machines (e.g., multiple servers configured in a cluster).

Databases and schemas may be used to organize data stored in the deployment 305 and each database may belong to a single account within the deployment 305. Each database may be thought of as a container having a classic folder hierarchy within it. Each database may comprise a logical grouping of schemas and a schema may comprise a logical grouping of database objects (tables, views, etc.). Each schema may belong to a single database. Together, a database and a schema may comprise a namespace. When performing any operations on objects within a database, the namespace is inferred from the current database and the schema that is in use for that particular session. If a database and schema are not in use for the session, the namespace must be explicitly specified when performing any operations on the objects. As shown in FIG. 3, the deployment 305 may host a provider account 310 including a database DB1 having a schema 320A that includes views V1 and V2.

FIG. 3 also illustrates share-based access to objects in the provider account 310. The provider account 310 may create a share 315, which aggregates all of the data objects that are to be shared by the provider account 310. In the example of FIG. 3, the provider account 310 may wish to share the database DB1, schema 320A, and views V1 and V2. The provider account 310 may add objects to the share 315 by leveraging role-based access control (RBAC), which enables the provider account 310 to indicate which objects are to be shared and allows specification of the type of privileges that will be granted on each specific object. More specifically, the share 315 may contain a single role 315A. Grants between role 315A and objects define what objects are being shared and with what privileges these objects are shared. The role 315A and grants may be similar to any other role and grant system in the implementation of RBAC. By modifying the set of grants attached to the role 315A in share 315, more objects may be shared (by adding grants to additional objects to the role 315A), fewer objects may be shared (by revoking grants from the role 315A), or objects may be shared with different privileges (by changing the type of grant, for example to allow write access to a shared table object that was previously read-only). For example, if role 315A has a usage grant on database DB1, it may be able to "see" this database when executing a command e.g., "show databases;" if role 315A has a select grant on a table, it can read from this table but not write to the table. Role 315A would need to have a modify grant on the table to be able to write to it. Once share 315 is populated, it may contain a list of privileges on objects that have been added to it.

After the share 315 is created, it may be imported or referenced by consumer account 350 (which has been listed in the share 315). Consumer account 350 may run a command to list all available shares for importing. Only if the share 315 was created with a reference to the consumer account 350, can the consumer account 350 reveal the share using the command to list all shares and subsequently import it. The share 315 can also be installed via the data marketplace and the listing associated with the share 315, if such a listing was created and bound to the share 315. In one embodiment, references to a share in another account are always qualified by account name. For example, consumer account 350 would reference a share SH1 in provider account A1 with the example qualified name "A1.SH1." The consumer account 350 may import the share 315 by mounting it and creating a shared database (hereinafter referred to and shown in FIG. 3 as imported database 355) therefrom, which may "project" the objects being shared via the share 315 into the consumer account 350. An administrator role 370 (e.g., an account level role) of the consumer account 350 may be given a usage grant to the imported database 355. In this way, a user in account 350 with the administrator role 370 may access data from DB1 in the provider account 310. In some embodiments, shares in provider account 310 may be imported into the target consumer account (illustrated as consumer account 350 in FIG. 3) using alias objects and cross-account role grants.

Embodiments of the present disclosure describe techniques for monitoring usage of data listings and pricing data listings based thereon. In one example, a processing device may add metadata comprising monetization data to a data listing to generate a monetized data listing. In response to a request from a consumer account to access the monetized data listing, the processing device may replicate the monetized data listing to the consumer account. As the consumer account queries the monetized data listing, usage data of the monetized data listing may be recorded and stored in a data persistence object (DPO), which may be an abstraction that defines how metadata objects are stored in the metadata database. Listing metadata of the monetized data listing may be stored in a separate DPO. The usage data and the listing data are exported to a data warehousing and analysis module. The data warehousing and analysis module may calculate a usage level for a set of jobs processed using the monetized data listing during a current incremental interval of a current billing interval. The usage level for the set of jobs during the current incremental interval may be combined with a usage level of all previous incremental intervals of the current billing interval to generate a cumulative usage record. An invoice for the billing interval may be generated based on the cumulative usage record.

FIG. 4 illustrates a cloud environment 400 comprising multiple remote cloud deployments 401, 402, and 403. Each of the remote deployments 401, 402, and 403 may comprise a similar architecture to deployment 305 (illustrated in FIG. 3). The remote deployments 401, 402, and 403 may all be physically located in separate remote geographical regions but may all be deployments of a single data exchange or single data marketplace. In cloud environment 400, requests for data such as data listings, databases, or shares on remote deployment 401 may originate from an account on remote deployment 402 or remote deployment 403. The remote deployment 401 may be the origin deployment of the data exchange or data marketplace and may utilize an appropriate data replication method to make the data of such a request available on remote deployments 402 and 403.

As shown in FIG. 4, the provider account 401A may create a listing 410 and add to the listing 410, metadata that defines how consumers will be charged for using the listing 410. In the example of FIG. 4, the metadata may comprise a pricing plan 410A, which may comprise a collection of attributes set by the provider account 401A that define how consumers pay for the listing. The pricing plan 410A may include attributes such as price (including fixed and variable price components), currency, and description of the data, among other attributes. When the provider account 401A associates at least one pricing plan with the listing 410 at creation time, this may result in the creation of a monetized listing 420. The monetized listing 420 may be updated in a manner similar to other data listings.

The remote deployment 401 may persist the listing 410 locally at which point it may be searched for by a data consumer as with any other data exchange listing (as discussed herein). The provider account 401A may replicate (as discussed hereinabove) the monetized listing 420 to the remote deployment 402. Although illustrated with a single consumer account 402A for ease of illustration and simplicity of description, this is not a limitation and any appropriate number of consumer accounts may reside on remote deployment 402 (or any of the remote deployments 401-403). The consumer account 402A may use e.g., a "view purchases" command in order to obtain the pricing information for all listings available to it. For each listing available to the consumer account 402A, the command may return an entry having pricing information. The pricing information of each entry may include a number of fields that each indicate an aspect of the pricing information including:
    listing global name (existing)—a string field that identifies a listing listing pricing plan—the pricing plan currently set on the listing is trial—a field that indicates if the listing is currently being used in trial mode. If the listing has not been imported, this field is unset.

active pricing plan—a field that indicates the price currently applicable to the consumer account 402A. In some embodiments, this field is only set when the listing is purchased. This value can be different from the value in the "listing pricing plan" field when the provider account has recently changed the pricing plan on the listing. If the listing has not been imported, this field is unset. In some embodiments, this value is unset by the remote deployment 401 on the first day of every month (or any appropriate billing interval), when the listing is in trial mode, or when there is no database associated with the listing.

The consumer account 402A may import the monetized listing 420 as discussed herein (shown as "monetized listing 420A (replica of 420)" in FIG. 4) from a share (not shown) associated with the monetized listing 420. In some embodiments, the provider account may have the option to turn on or off the ability for consumers to query data of the monetized listing 420A. In such embodiments, the ability for consumers to query monetized data will need to be explicitly turned on by the provider account 401A. Without the purchase enablement, consumers of the data of monetized listing 420A may only have access to free data in the monetized listing 420A (if any). At this point, the consumer account 402A may begin running queries on the monetized listing 420A.

In some embodiments, the consumer account 402A may need to enable purchases on the local database DBX2 which may then be marked by remote deployment 402 as a database that has been enabled for purchasing data from listings. When the consumer account 402A runs a query, the secure view (not shown) corresponding to monetized listing 420A which was created during the process of sharing the data (as discussed herein) of monetized listing 420 checks if the database DBX2 has been enabled for purchases and the information about the monetized listing 420A which was used as part of the query is inserted into the Job DPO 430 to be exported to the monetizer 405, as discussed in further detail herein.

Remote deployment 402 may include a local database (not shown) which may be any appropriate database/metadata store, such as FoundationDB for example. The local database of remote deployment 402 may include a number of DPOs in which data pertaining to the data exchange may be stored. For example, a base dictionary DPO may comprise a set of database tables used to store information about the database DBX2's definition including information about database objects such as tables, indexes, columns, data types, and views. Another such DPO may be the Job DPO 430 which may store job metadata including usage information of data listings. When the consumer account 402A (or any other consumer account) runs a query, if the query accesses any objects that are defined in a monetized listing (whether purchased or accessed on a trial basis) such as monetized listing 420, the remote deployment 402 (via an object name resolver (not shown)) may detect such access during query compilation time, and track the usage of each of those monetized listings (referred to herein as "usage information"). Examples of the types of usage tracked by the remote deployment 402 include profiling stats like the duration spent in each step of executing the query, CPU time consumed by the query, idle time consumed by the query, a share referenced by the query, and a number of files in the share that are the subject of the query, among others. The remote deployment 402 may also track a list of purchased databases (from the share that came from a monetized listing) referenced in the query and a list of databases referenced in the query that are in trial mode. When processing of the query is complete, the remote deployment 402 (e.g., a processing device thereof) may record the usage information for each of those monetized listings in the Job DPO 430. The Job DPO 430 may store usage information on a per consumer (i.e., per consumer account), per job, and per data listing basis. Thus, for each consumer account, the Job DPO 430 may include an entry for each monetized listing that a query executed by the consumer account accessed data from. Each entry may include a number of fields indicating an aspect of the usage information for that monetized listing. In some embodiments, the Job DPO 430 may have an additional JSON serialized field which contains 2 array fields: "monetizeableListings" which is an array of purchased listing IDs and "freeListings" which is an array of free listing IDs. In addition, information about the monetized listing 420A which was used as part of the query may also be inserted into the Job DPO 430. For example, each item in the 'monetizeableListings' and 'freeListings' arrays may be an integer identifier, identifying an instance of a share mount. This identifier is generated whenever a consumer mounts a share and may be inserted into the Job DPO 430.

Yet another such DPO may be a listing import DPO 440, which may include metadata regarding pricing plan information on a per data listing and per consumer account basis (in the example of FIG. 4, metadata regarding the pricing plan 410A of monetized listing 420). Thus, for each consumer account, the listing import DPO 440 may include multiple entries, each entry corresponding to a monetized listing that the consumer account has imported. Each entry in the listing import DPO 440 may have a number of fields, each of which have a particular data type (e.g., long, Boolean, string etc.) and each of which serve to identify information about the imported monetized data listing. The fields of an entry within the listing import DPO 440 may include:

import ID: which may be a number used to uniquely identify an instance of listing import and the consumer account that imported the listing. Each entry in the listing import DPO 440 may have a unique import ID. In some embodiments, the import ID for each listing may be a number that is part of an increasing sequence, while in other embodiments the import ID for each listing may be a randomly generated number.

consumer account ID: which may identify the consumer account that has imported the listing.

listing deployment ID: this field indicates a deployment ID for the listing ID.

listing entity ID: which may identify the listing being imported. The listing entity ID may be used along with the listing deployment ID to identify the listing (as the listing entity ID itself is not unique across deployments).

share entity ID: the share entity ID may identify the particular share object which includes the listing's data and which is mounted to import the listing into the consumer account. The listing entity ID and share entity Id are fields that are set when a listing is first imported.

is trial: this field indicates whether purchases have been enabled on the listing. Queries on the associated databases are only charged if this value is TRUE.

active pricing plan: this field provides a JSON structure with pricing attributes. This is the price that a query using this listing will be charged.

active pricing plan end time: this field provides a timestamp after which the active pricing plan will be replaced by the future pricing plan. Thus, if a consumer account purchases the listing, and the provider account changes the pricing plan immediately after, this attribute tells how long they can keep the price plan that they bought the listing at before being transitioned to a new price plan. This field may be unset if there is no future pricing plan scheduled.

future pricing plan: this field comprises a JSON structure with pricing attributes representing a pricing plan that will replace the active pricing plan after the active pricing plan end time has passed.

purchase order ID: this field provides an identifier that is generated in the consumer account 402A's procurement system. The consumer account 402A may enter this at the time of data purchase and the monetizer 405 may add the purchase order ID to the invoice of the consumer account 402A as discussed in further detail herein.

import metadata: this field provides a JSON string that contains metadata about this particular listing import instance such as information about the user who imported the listing.

updated on: this field provides a timestamp of the last update.

deleted on: this field provides a timestamp of the last deletion. The deleted on field is set when an entry is deleted and may be maintained for any appropriate period of time (e.g., one month) after which a background service deletes it.

The listing import DPO 440 may include a number of slices to facilitate export of the data within it. For example, the listing import DPO 440 may include an "updated on" slice (not shown), which may include all updates to the listing import DPO 440 since the last export. Thus, when the remote deployment 402 performs the next export of data in the listing import DPO 440, it may query the updated on slice to ensure that it is only exporting data that is newly added to the slice and not duplicating data that was already exported. The remote deployment 402 may export the contents of the job DPO 430 and the listing import DPO 440 to the data warehousing and analysis service 403A of remote deployment 403 at regular intervals (also referred to herein as "export frequency"). For example, the remote deployment 402 may export the contents of these DPOs once per hour, once every fifteen minutes, once every thirty minutes, or any other appropriate interval. It should be noted that the export frequency for one or more of the listing import DPO 440 and the Job DPO 430 may be tuned to be more or less frequent based on the functions to be performed by the data warehousing and analysis service 403A. For example, if usage reports are to be sent out to consumers on a daily basis (as described in further detail herein), the export frequency may be set to once a day. In another example, if no daily report is to be sent, and only an invoice is to be sent out at the end of a month, then the export frequency may be set to once a month. In a case where both daily reports and monthly invoices are to be generated, the export frequency may be set to the smaller of the two (e.g., once daily). In some embodiments, the export frequency may be set based on what the data exchange can handle (e.g., 15 minutes).

Continuing to refer to FIG. 4, remote deployment 403 may execute a data warehousing and analysis service 403A, which may include tables 404 into which data from the job DPO 430 and the listing import DPO 440 may be imported, a monetizer 405 which may execute a series of data pipelines to process the incoming data from the job DPO 430 and the listing import DPO 440 to generate charge events, and an invoice generator 406 which may read the charge events and then generate invoices for invoicing at regular billing intervals. Although the billing interval may be any appropriate time period, embodiments of the present disclosure are described in terms of a month long billing interval (e.g., monthly invoice generation).

Figure 5A:
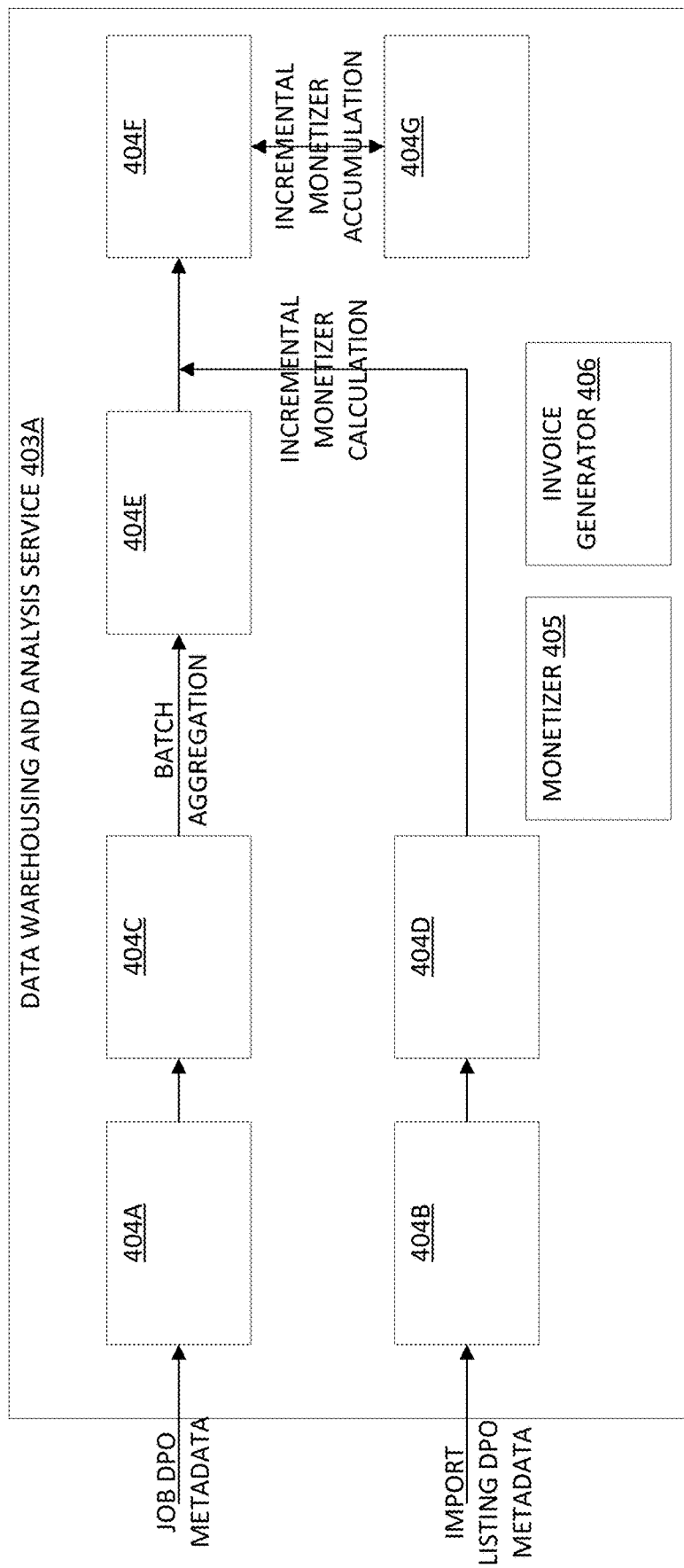

FIGS. 5A-5H illustrate the functioning of the data warehousing and analysis service 403A. Data from the job DPO 430 and the listing import DPO 440 may be imported into tables 404A and 404B respectively. The monetizer 405 may utilize data streaming on the table 404A to generate a stream of the metadata stored in table 404A. The monetizer 405 may then read raw data from the stream of the table 404A, and extract the listing usage information that originates from the job DPO 430, and output the result into table 404C on a per listing and per job basis. The monetizer 405 may filter out the jobs which do not query monetized listings and jobs failed due to internal errors (not user errors), as well as filter out the jobs which are already in the table 404C for deduplication purposes. The monetizer 405 may then extract all listing IDs and save all usage related data into table 404C. FIG. 5B illustrates an example of the table 404C. The monetizer 405 may perform this task at regular intervals (e.g., every 5 minutes), and may modify the intervals at which it is performed based on the functions to be performed by the data warehousing and analysis service 403A, as described hereinabove. By creating a stream of the data in table 404A, the monetizer 405 may process records from the stream continuously for all new jobs without needing to query the table 404A, which may be large in size. This in turn results in significant improvements in processing and latency.

The monetizer 405 may merge the metadata received from the listing import DPO 440 into the table 404B, which may be an extract, transform, load (ETL) table (or an extract, load, transform (ELT) table), and then extract the price plan information from the table 404B, which contains all of the data imported from the listing import DPO 440, and append the price plan information of the current month (billing interval) into a table 404D, which may be dedicated to storing the current billing interval's price plan for each of the monetized listings. More specifically, the monetizer 405 may schedule a price plan extraction task to run at regular intervals (e.g., every hour or more frequently) which will retrieve all the latest versions of the metadata for each monetized listing from the table 404B. This task may run at any appropriate interval (e.g., on an hourly basis). The monetizer 405 may then determine for each monetized listing, whether there is a price entry for the current month in table 404D. If there is no entry yet, then the monetizer 405 may append a new entry in the table 404D with the price plan from the active pricing plan field of the monetized listing's entry in the listing import DPO 440 as long as the active pricing plan end time field is null or is after the current time. Otherwise, the monetizer 405 may utilize the price plan indicated in the future price plan field of the monetized listing's entry in the listing import DPO 440. FIG. 5C illustrates an example of table 404D.

For every job ID in the job metadata of the job DPO 430, the monetizer 405 may look up which monetized listings have been used for that job. For each monetized listing used, there will be a unique ID (the import ID), and each import ID will point to a particular entry in the metadata of listing import DPO 440. For each identified monetized listing (identified based on import IDs), the monetizer 405 may look up the corresponding entry in the listing import DPO 440, and obtain the pricing plan for that monetized listing. If the monetizer 405 determines that the job ID corresponds to the first query in the current billing interval, then the monetizer 405 may add a fixed price charge and then add a per-query charge for each subsequent use of the monetized listing.

The monetizer 405 may then create a stream of the data in table 404C and perform batch aggregation of the data in table 404C by consuming the data from the stream, aggregating the total usage on a per customer, per listing ID, and per usage date level, and saving the result into table 404E. FIG. 5D illustrates an example of the table 404E.

The monetizer 405 may then perform two functions based on the data in table 404E simultaneously. The monetizer 405 may perform an incremental monetizer calculation to calculate real monetizer value for all jobs processed during a current incremental interval. The incremental interval may represent a time period over which the usage of monetized listings will be monitored and reported on, but not invoiced. For example, if the incremental interval is a day, then there are on average 30 incremental intervals during a billing interval (a month in the current example). Thus, during each incremental interval, the monetizer 405 may monitor the usage level of each monetized listing during that incremental interval and store the usage of each monetized listing during that incremental interval in table 404F as an incremental monetizer record. More specifically, the monetizer 405 may read unprocessed data from the table 404E, and perform an enrichment to normalize the data in the table 404E, since the data in table 404E is at a daily granularity and only has the query counts, while the data in table 404F needs to have the fields from the pricing plan. Because the data in the table 404F is at a daily granularity for generation of usage reports (as discussed in further detail herein) and the data in the table 404G is at the monthly granularity, the monetizer 405 may then combine the aggregated data from the table 404E with the current month's total usage from table 404G (as discussed in further detail herein), then apply the price plan of the current billing interval (for each monetized listing) in table 404D to generate incremental monetizer records, which will be saved into the table 404F. FIG. 5E illustrates an example of the table 404F. It should be noted that the incremental interval may be any appropriate time period (e.g., hour, two hours, a day, etc.) It should be noted that ultimately, the frequency/interval at which each task performed by the data warehousing and analysis service 403A do not influence its overall output since each task simply reads (from the appropriate table 404) the result generated by the previous task and if not result is present, no work is performed. Thus, the frequency at which each task may be performed may be different. For example, the monetizer 405's reading of raw data from the stream of the table 404A, extraction of the listing usage information, and storage of the result into table 404C may occur every 15 mins as data from the Job DPO 430 is imported every 15 mins, Meanwhile, the merging of the metadata received from the listing import DPO 440 into the table 404B may occur every hour as data from the listing import DPO 440 is imported once an hour. However, this difference in frequency does not matter because until the monetizer 405 locates all related information about a usage row, it will not be marked as completed/processed.

The total monetizer value of the billing interval is based on the total usage from the beginning of the month to the current processing time. Because the table 404F (incremental monetizer) only contains incremental monetizer records indicating usage over a relatively short period of time (i.e., the incremental interval), in order to calculate the monetizer value, the monetizer 405 also needs the total usage from the beginning of the billing interval, which it will store in a table 404G. Thus, while performing the incremental monetizer calculation, the monetizer 405 may simultaneously perform an incremental monetizer accumulation wherein it may combine the usage of the job batch corresponding to the current incremental interval with the total usage of the current month. More specifically, the monetizer 405 may sum together all incremental monetizer records which are generated in the current month (including the incremental monetizer record from the current incremental interval) from the table 404F and create a new accumulated result for the current month (also referred to herein as cumulative monetizer record), and save the new cumulative monetizer record into table 404G. As discussed hereinabove, the monetizer 405 may perform these tasks simultaneously and at any appropriate interval (e.g., on an hourly basis) and may tune the interval as necessary based on data volume and latency change.

The monetizer 405 may then initiate a monthly monetizer generation task which will consume the cumulative monetizer record from table 404G at the end of each month, and generate a monthly monetizer record for use by the invoice generator 406. FIG. 5G illustrates an example of a monthly monetizer record. The monthly monetizer generation task may run once per billing interval after a defined monthly billing cut off time. Once the monthly monetizer record has been created, the invoice generator 406 may utilize the monthly monetizer record to create an invoice. The remote deployment 403 may issue an API call including the created invoice to a third party payment platform (e.g., Stripe™) indicating the accounts and corresponding amounts that need to be charged.

Figure 5H:
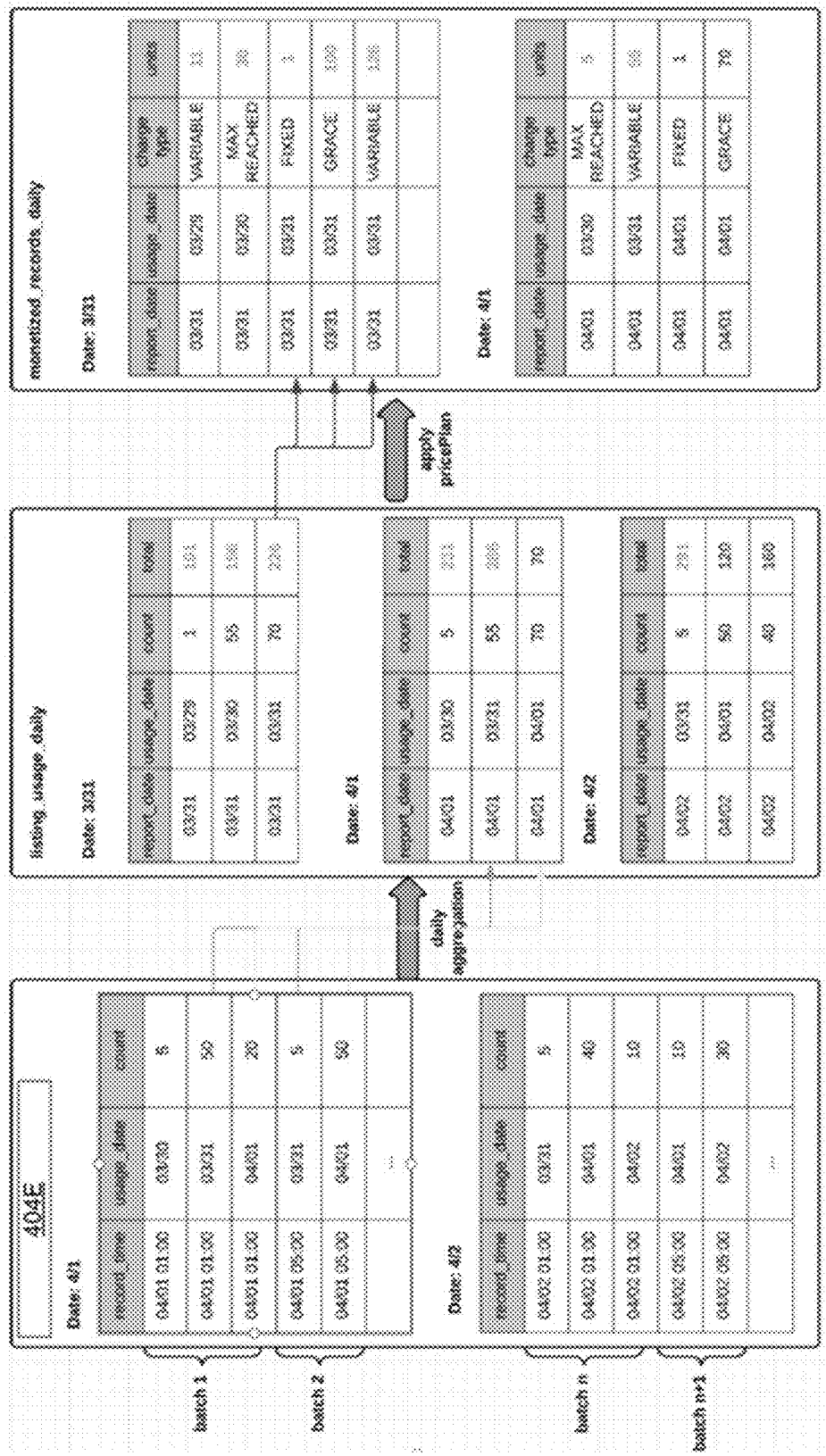

The monetizer 405 may also initiate an incremental interval usage report task that will use the data from table 404F to generate a usage report at each incremental interval for each listing. FIG. 5H illustrates the use of the data in table 404F to generate a daily (the incremental interval in the example of FIGS. 5A-5H) usage report as well as an example reporting structure of the daily usage report. As discussed herein, the monetizer 405 may read unprocessed data from the table 404E and perform an additional level of aggregation to obtain the daily usage information for each listing (only daily usage information for a single listing is shown in FIG. 5H). The monetizer 405 may then apply the monthly price plan in table 404D to generate incremental monetizer records (stored in table 404F) which may be used by the daily monetizer usage report task to generate a daily usage report as shown in FIG. 5H.

FIG. 6 is a flow diagram of a method 600 for monitoring usage of data listings and pricing data listings based thereon, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by remote deployments 401-403 of cloud environment 400 (illustrated in FIG. 4).

Referring simultaneously to FIG. 4, at block 605, the provider account 401A may create a listing 410 and add to the listing 410, metadata that defines how consumers will be charged for using the listing 410, thereby generating a monetized data listing 420. In the example of FIG. 4, the metadata may comprise a pricing plan 410A, which may comprise a collection of attributes set by the provider account 401A that define how consumers pay for the listing. The pricing plan 410A may include attributes such as price (including fixed and variable price components), currency, and description of the data, among other attributes. The monetized listing 420 may be updated in a manner similar to other data listings.

The remote deployment 401 may persist the listing 410 locally at which point it may be searched for by a data consumer as with any other data exchange listing (as discussed herein). The provider account 401A may replicate (as discussed hereinabove) the monetized listing 420 to the remote deployment 402. Although illustrated with a single consumer account 402A for ease of illustration and simplicity of description, this is not a limitation and any appropriate number of consumer accounts may reside on remote deployment 402 (or any of the remote deployments 401-403). The consumer account 402A may use e.g., a "view purchases" command in order to obtain the pricing information for all listings available to it. For each listing available to the consumer account 402A, the command may return an entry having pricing information. The pricing information of each entry may include a number of fields that each indicate an aspect of the pricing information.

At block 610, the consumer account 402A may import the monetized listing 420 as discussed herein (shown as "monetized listing 420A (replica of 420)" in FIG. 4) from a share (not shown) associated with the monetized listing 420. In some embodiments, the provider account may have the option to turn on or off the ability for consumers to query data of the monetized listing 420A. In such embodiments, the ability for consumers to query monetized data will need to be explicitly turned on by the provider account 401A. Without the purchase enablement, consumers of the data of monetized listing 420A may only have access to free data in the monetized listing 420A (if any). At this point, the consumer account 402A may begin running queries on the monetized listing 420A.

Remote deployment 402 may include a local database (not shown) which may be any appropriate database/metadata store, such as FoundationDB for example. The local database of remote deployment 402 may include a number of data persistence objects (DPOs) in which data pertaining to the data exchange may be stored. For example, a base dictionary DPO may comprise a set of database tables used to store information about the database DBX2's definition including information about database objects such as tables, indexes, columns, data types, and views. Another such DPO may be the Job DPO 430 which may store job metadata including usage information of data listings. When the consumer account 402A (or any other consumer account) runs a query, if the query accesses any objects that are defined in a monetized listing (whether purchased or accessed on a trial basis) such as monetized listing 420, the remote deployment 402 (via an object name resolver (not shown)) may detect such access during query compilation time, and track the usage of each of those monetized listings (referred to herein as "usage information"). When processing of the query is complete, the remote deployment 402 (e.g., a processing device thereof) may record the usage information for each of those monetized listings in the Job DPO 430. The Job DPO 430 may store usage information on a per consumer (i.e., per consumer account), per job, and per data listing basis.

Yet another such DPO may be a listing import DPO 440, which may include metadata regarding pricing plan information on a per data listing and per consumer account basis (in the example of FIG. 4, metadata regarding the pricing plan 410A of monetized listing 420). Thus, for each consumer account, the listing import DPO 440 may include multiple entries, each entry corresponding to a monetized listing that the consumer account has imported. Each entry in the listing import DPO 440 may have a number of fields, each of which have a particular data type (e.g., long, Boolean, string etc.) and each of which serve to identify information about the imported monetized data listing.

At block 615, the remote deployment 402 may export the contents of the job DPO 430 and the listing import DPO 440 to the data warehousing and analysis service 403A of remote deployment 403 at regular intervals (also referred to herein as "export frequency"). For example, the remote deployment 402 may export the contents of these DPOs once per hour, once every fifteen minutes, once every thirty minutes, or any other appropriate interval. It should be noted that the export frequency for one or more of the listing import DPO 440 and the Job DPO 430 may be tuned to be more or less frequent.

Continuing to refer to FIG. 4, remote deployment 403 may execute a data warehousing and analysis service 403A, which may include tables 404 into which data from the job DPO 430 and the listing import DPO 440 may be imported, a monetizer 405 which may execute a series of data pipelines to process the incoming data from the job DPO 430 and the listing import DPO 440 to generate charge events, and an invoice generator 406 which may read the charge events and then generate invoices for invoicing at regular billing intervals. Although the billing interval may be any appropriate time period, embodiments of the present disclosure are described in terms of a month long billing interval (e.g., monthly invoice generation).

FIGS. 5A-5H illustrate the functioning of the data warehousing and analysis service 403A. Data from the job DPO 430 and the listing import DPO 440 may be imported into tables 404A and 404B respectively. The monetizer 405 may utilize data streaming on the table 404A to generate a stream of the metadata stored in table 404A. The monetizer 405 may then read raw data from the stream of the table 404A, and extract the listing usage information that originates from the job DPO 430, and output the result into table 404C on a per listing and per job basis. The monetizer 405 may filter out the jobs which do not query monetized listings and jobs failed due to internal errors (not user errors), as well as filter out the jobs which are already in the table 404C for deduplication purposes. The monetizer 405 may then extract all listing IDs and save all usage related data into table 404C. FIG. 5B illustrates an example of the table 404C. The monetizer 405 may perform this task at regular intervals (e.g., every 5 minutes), and may modify the intervals at which it is performed based on. By creating a stream of the data in table 404A, the monetizer 405 may process records from the stream continuously for all new jobs without needing to query the table 404A, which may be large in size. This in turn results in significant improvements in processing and latency.

The monetizer 405 may merge the metadata received from the listing import DPO 440 into the table 404B, which may be an extract, transform, load (ETL) table, and then extract the price plan information from the table 404B, which contains all of the data imported from the listing import DPO 440, and append the price plan information of the current month (billing interval) into a table 404D, which may be dedicated to storing the current billing interval's price plan for each of the monetized listings. More specifically, the monetizer 405 may schedule a price plan extraction task to run at regular intervals (e.g., every hour or more frequently) which will retrieve all the latest versions of the metadata for each monetized listing from the table 404B. This task may run at any appropriate interval (e.g., on an hourly basis). The monetizer 405 may then determine for each monetized listing, whether there is a price entry for the current month in table 404D. If there is no entry yet, then the monetizer 405 may append a new entry in the table 404D with the price plan from the active pricing plan field of the monetized listing's entry in the listing import DPO 440 as long as the active pricing plan end time field is null or is after the current time. Otherwise, the monetizer 405 may utilize the price plan indicated in the future price plan field of the monetized listing's entry in the listing import DPO 440. FIG. 5C illustrates an example of table 404D.

For every job ID in the job metadata of the job DPO 430, the monetizer 405 may look up which monetized listings have been used for that job. For each monetized listing used, there will be a unique ID (the import ID), and each import ID will point to a particular entry in the metadata of listing import DPO 440. For each identified monetized listing (identified based on import IDs), the monetizer 405 may look up the corresponding entry in the listing import DPO 440, and obtain the pricing plan for that monetized listing. If the monetizer 405 determines that the job ID corresponds to the first query in the current billing interval, then the monetizer 405 may add a fixed price charge and then add a per-query charge for each subsequent use of the monetized listing.

The monetizer 405 may then create a stream of the data in table 404C and perform batch aggregation of the data in table 404C by consuming the data from the stream, aggregating the total usage on a per customer, per listing ID, and per usage date level, and saving the result into table 404E. FIG. 5D illustrates an example of the table 404E.

The monetizer 405 may then perform two functions based on the data in table 404E simultaneously. At block 620, the monetizer 405 may perform an incremental monetizer calculation to calculate real monetizer value for all jobs processed during a current incremental interval. The incremental interval may represent a time period over which the usage of monetized listings will be monitored and reported on, but not invoiced. For example, if the incremental interval is a day, then there are on average 30 incremental intervals during a billing interval (a month in the current example). Thus, during each incremental interval, the monetizer 405 may monitor the usage level of each monetized listing during that incremental interval and store the usage of each monetized listing during that incremental interval in table 404F as an incremental monetizer record. More specifically, the monetizer 405 may read unprocessed data from the table 404E, perform an enrichment to normalize the data, combine the aggregated data from the table 404E with the current month's total usage from table 404G (as discussed in further detail herein), then apply the price plan of the current billing interval (for each monetized listing) in table 404D to generate incremental monetizer records, which will be saved into the table 404F. FIG. 5E illustrates an example of the table 404F. It should be noted that the incremental interval may be any appropriate time period (e.g., hour, two hours, a day, etc.).

The total monetizer value of the billing interval is based on the total usage from the beginning of the month to the current processing time. Because the table 404F (incremental monetizer) only contains incremental monetizer records indicating usage over a relatively short period of time (i.e., the incremental interval), in order to calculate the monetizer value, the monetizer 405 also needs the total usage from the beginning of the billing interval, which it will store in a table 404G. Thus, while performing the incremental monetizer calculation, at block 625 the monetizer 405 may simultaneously perform an incremental monetizer accumulation wherein it may combine the usage of the job batch corresponding to the current incremental interval with the total usage of the current month. More specifically, the monetizer 405 may sum together all incremental monetizer records which are generated in the current month (including the incremental monetizer record from the current incremental interval) from the table 404F and create a new accumulated result for the current month (also referred to herein as cumulative monetizer record), and save the new cumulative monetizer record into table 404G. As discussed hereinabove, the monetizer 405 may perform these tasks simultaneously and at any appropriate interval (e.g., on an hourly basis) and may tune the interval as necessary based on data volume and latency change.

At block 630, the monetizer 405 may then initiate a monthly monetizer generation task which will consume the cumulative monetizer record from table 404G at the end of each month, and generate a monthly monetizer record for use by the invoice generator 406. FIG. 5G illustrates an example of a monthly monetizer record. The monthly monetizer generation task may run once per billing interval after a defined monthly billing cut off time. Once the monthly monetizer record has been created, the invoice generator 406 may utilize the monthly monetizer record to create an invoice. The remote deployment 403 may issue an API call including the created invoice to a third party payment platform (e.g., Stripe™) indicating the accounts and corresponding amounts that need to be charged.

The monetizer 405 may also initiate an incremental interval usage report task that will use the data from table 404F to generate a usage report at each incremental interval for each listing. FIG. 5H illustrates the use of the data in table 404F to generate a daily (the incremental interval in the example of FIGS. 5A-5H) usage report as well as an example reporting structure of the daily usage report. As discussed herein, the monetizer 405 may read unprocessed data from the table 404E and perform an additional level of aggregation to obtain the daily usage information for each listing (only daily usage information for a single listing is shown in FIG. 5H). The monetizer 405 may then apply the monthly price plan in table 404D to generate incremental monetizer records (stored in table 404F) which may be used by the daily monetizer usage report task to generate a daily usage report as shown in FIG. 5H.

Figure 7:
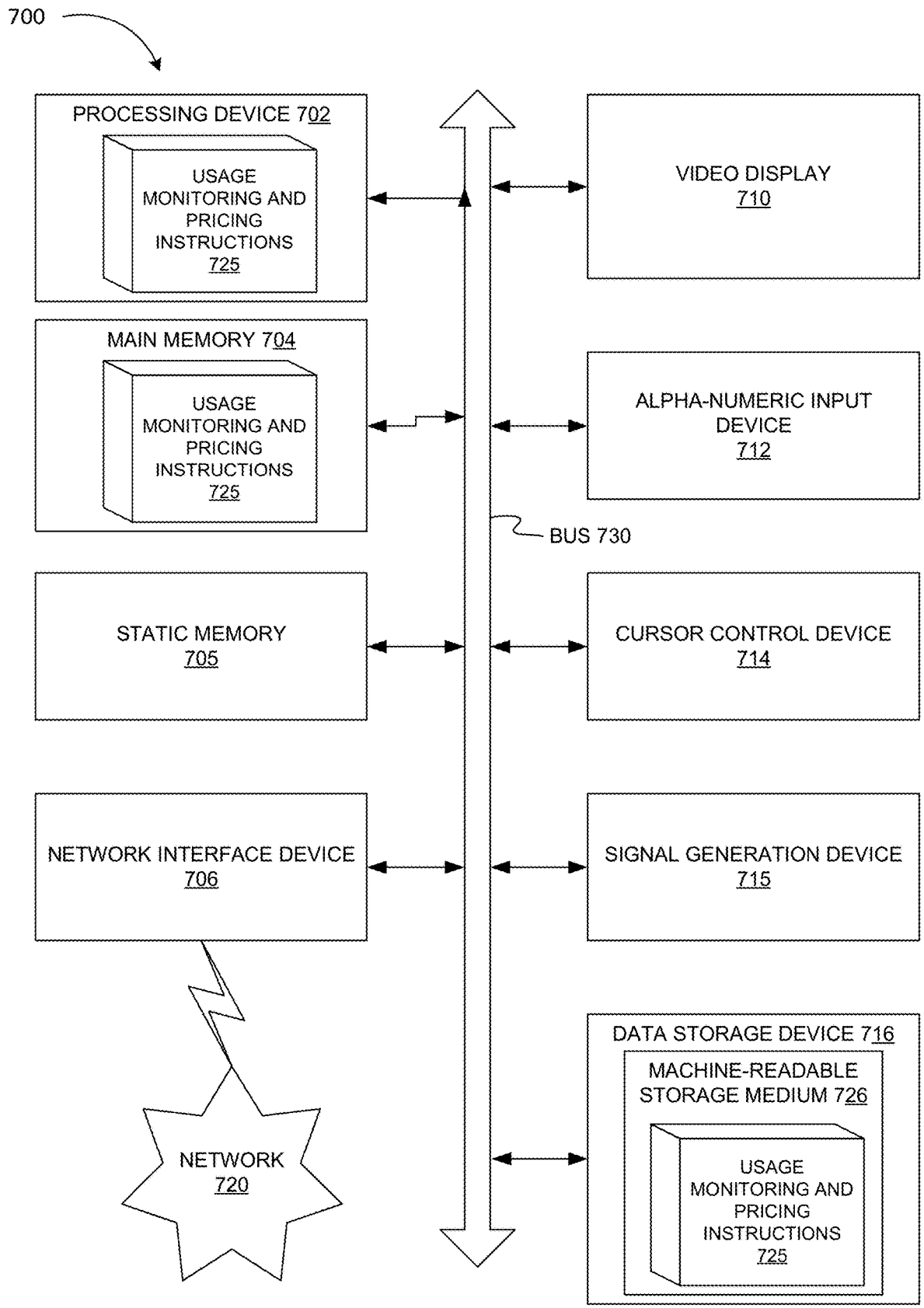
FIG. 7 is a block diagram of an example computing device that may perform one or more of the operations described herein, in accordance with some embodiments of the present invention.

FIG. 7 illustrates a diagrammatic representation of a machine in the example form of a computer system 700 within which a set of instructions, for causing the machine to perform any one or more of the methodologies discussed herein for monitoring usage of data listings and pricing data listings based thereon.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The exemplary computer system 700 includes a processing device 702, a main memory 704 (e.g., read-only memory (ROM), flash memory, dynamic random access memory (DRAM), a static memory 705 (e.g., flash memory, static random access memory (SRAM), etc.), and a data storage device 716, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 706 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 715 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute usage monitoring and pricing instructions 725, for performing the operations and steps discussed herein.

The data storage device 716 may include a machine-readable storage medium 726, on which is stored one or more sets of usage monitoring and pricing instructions 725 (e.g., software) embodying any one or more of the methodologies of functions described herein. The usage monitoring and pricing instructions 725 may also reside, completely or at least partially, within the main memory 704 or within the processing device 702 during execution thereof by the computer system 700; the main memory 704 and the processing device 702 also constituting machine-readable storage media. The usage monitoring and pricing instructions 725 may further be transmitted or received over a network 720 via the network interface device 706.

The machine-readable storage medium 726 may also be used to store instructions to perform a method for determining functions to compile, as described herein. While the machine-readable storage medium 726 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:

adding metadata comprising a pricing plan to a data listing as the data listing is being created to generate a monetized data listing, wherein the pricing plan comprises a set of attributes that define how a consumer is charged for accessing and using data to be shared via the data listing;

in response to a request from a consumer account to access the monetized data listing, importing the monetized data listing to the consumer account;

exporting usage data of the monetized data listing and listing data of the monetized data listing to a data warehousing and analysis module, wherein the listing data of the monetized data listing comprises:

an import identifier (ID) used to uniquely identify an instance of the monetized data listing being imported and a particular consumer account that imported the listing;

an active pricing plan that provides pricing attributes;

a timestamp after which the active pricing plan will be replaced; and a future pricing plan that provides pricing attributes, and will replace the active pricing plan after expiration of the time stamp;

calculating a usage level for a set of jobs processed using the usage data and the listing data of the monetized data listing during a current incremental interval of a current billing interval, wherein the usage level comprises chargeable events associated with accessing and using the data listing in the current incremental interval;

combining, by a processing device, the usage level for the set of jobs during the current incremental interval with a usage level of all previous incremental intervals of the current billing interval to generate a cumulative usage record; and generating an invoice for the billing interval based on the cumulative usage record.

2. The method of claim 1, further comprising:

issuing an application program interface (API) call including the invoice to a payment platform.

3. The method of claim 1, further comprising:

recording the usage data of the monetized data listing in a first data persistence object (DPO); and storing the listing data of the monetized data listing in a second DPO.

4. The method of claim 1, further comprising:

calculating a usage level for a set of jobs processed using the monetized data listing during each of one or more subsequent incremental intervals; and for each of the one or more subsequent incremental intervals, generating a usage report indicating usage of the monetized data listing during the subsequent incremental interval.

5. The method of claim 1, further comprising:

combining the usage level for the set of jobs processed using the monetized data listing during the current incremental interval with the pricing plan to generate incremental monetizer records.

6. The method of claim 1, further comprising:

creating, by the data warehousing and analysis module, a stream of the usage data of the monetized data listing.

7. The method of claim 1, wherein the usage data of the monetized data listing and the listing data of the monetized data listing are exported to the data warehousing and analysis module at a first frequency and a second frequency respectively.

8. The method of claim 1, wherein the usage data comprises: an amount of time spent in each step of executing the request, CPU time consumed by the request, idle time consumed by the request, a share referenced by the request, and a number of files in the share that were the subject of the request.

9. A system comprising:

a memory; and a processing device operatively coupled to the memory, the processing device to:

add metadata comprising a pricing plan to a data listing as the data listing is being created to generate a monetized data listing, wherein the pricing plan comprises a set of attributes that define how a consumer is charged for accessing and using data to be shared via the data listing;

in response to a request from a consumer account to access the monetized data listing, import the monetized data listing to the consumer account;

export usage data of the monetized data listing and listing data of the monetized data listing to a data warehousing and analysis module, wherein the listing data of the monetized data listing comprises:

an import identifier (ID) used to uniquely identify an instance of the monetized data listing being imported and a particular consumer account that imported the listing;

an active pricing plan that provides pricing attributes;

a timestamp after which the active pricing plan will be replaced; and a future pricing plan that provides pricing attributes, and will replace the active pricing plan after expiration of the time stamp;

calculate a usage level for a set of jobs processed using the usage data and the listing data of the monetized data listing during a current incremental interval of a current billing interval, wherein the usage level comprises chargeable events associated with accessing and using the data listing in the current incremental interval;

combine the usage level for the set of jobs during the current incremental interval with a usage level of all previous incremental intervals of the current billing interval to generate a cumulative usage record; and generate an invoice for the billing interval based on the cumulative usage record.

10. The system of claim 9, wherein the processing device is further to:

issuing an application program interface (API) call including the invoice to a payment platform.

11. The system of claim 9, wherein the processing device is further to:

recording the usage data of the monetized data listing in a first data persistence object (DPO); and storing the listing data of the monetized data listing in a second DPO.

12. The system of claim 9, wherein the processing device is further to:

calculate a usage level for a set of jobs processed using the monetized data listing during each of one or more subsequent incremental intervals; and for each of the one or more subsequent incremental intervals, generate a usage report indicating usage of the monetized data listing during the subsequent incremental interval.

13. The system of claim 9, wherein the processing device is further to:

combine the usage level for the set of jobs processed using the monetized data listing during the current incremental interval with the pricing plan to generate incremental monetizer records.

14. The system of claim 9, wherein the processing device is further to:

create, by the data warehousing and analysis module, a stream of the usage data of the monetized data listing.

15. The system of claim 9, wherein the processing device exports the usage data of the monetized data listing and the listing data of the monetized data listing to the data warehousing and analysis module at a first frequency and a second frequency respectively.

16. The system of claim 9, wherein the usage data comprises: an amount of time spent in each step of executing the request, CPU time consumed by the request, idle time consumed by the request, a share referenced by the request, and a number of tiles in the share that were the subject of the request.

17. A non-transitory computer-readable medium having instructions stored thereon which, when executed by a processing device, cause the processing device to:
add metadata comprising a pricing plan to a data listing as the data listing is being created to generate a monetized data listing, wherein the pricing plan comprises a set of attributes that define how a consumer is charged for accessing and using data to be shared via the data listing;
in response to a request from a consumer account to access the monetized data listing, import the monetized data listing to the consumer account;
export usage data of the monetized data listing and listing data of the monetized data listing to a data warehousing and analysis module, wherein the listing data of the monetized data listing comprises:
an import identifier (ID) used to uniquely identify an instance of the monetized data listing being imported and a particular consumer account that imported the listing;
an active pricing plan that provides pricing attributes;
a timestamp after which the active pricing plan will be replaced; and
a future pricing plan that provides pricing attributes, and will replace the active pricing plan after expiration of the time stamp;
calculate a usage level for a set of jobs processed using the usage data and the listing data of the monetized data listing during a current incremental interval of a current billing interval, wherein the usage level comprises events associated with accessing and using the data listing in the current incremental interval;
combine, by the processing device, the usage level for the set of jobs during the current incremental interval with a usage level of all previous incremental intervals of the current billing interval to generate a cumulative usage record; and
generate an invoice for the billing interval based on the cumulative usage record.

18. The non-transitory computer-readable medium of claim 17, wherein the processing device is further to:
issuing an application program interface (API) call including the invoice to a payment platform.

19. The non-transitory computer-readable medium of claim 17, wherein the processing device is further to:
recording the usage data of the monetized data listing in a first data persistence object (DPO); and
storing the listing data of the monetized data listing in a second DPO.

20. The non-transitory computer-readable medium of claim 17, wherein the processing device is further to:
calculate a usage level for a set of jobs processed using the monetized data listing during each of one or more subsequent incremental intervals; and
for each of the one or more subsequent incremental intervals, generate a usage report indicating usage of the monetized data listing during the subsequent incremental interval.

21. The non-transitory computer-readable medium of claim 17, wherein the processing device is further to:
combine the usage level for the set of jobs processed using the monetized data listing during the current incremental interval with the pricing plan to generate incremental monetizer records.

22. The non-transitory computer-readable medium of claim 17, wherein the processing device is further to:
create, by the data warehousing and analysis module, a stream of the usage data of the monetized data listing.

23. The non-transitory computer-readable medium of claim 17, wherein the processing device exports the usage data of the monetized data listing and the listing data of the monetized data listing to the data warehousing and analysis module at a first frequency and a second frequency respectively.

24. The non-transitory computer-readable medium of claim 17, wherein the usage data comprises: an amount of time spent in each step of executing the request, CPU time consumed by the request, idle time consumed by the request, a share referenced by the request, and a number of tiles in the share that were the subject of the request.

* * * * *